(12) United States Patent
Leah et al.

(10) Patent No.: US 8,778,556 B2
(45) Date of Patent: Jul. 15, 2014

(54) FUEL CELLS

(75) Inventors: Robert Leah, Crawley (GB); Karim El Koury, Crawley (GB); Martin Schmidt, Crawley (GB)

(73) Assignee: Ceres Intellectual Property Company Limited, Crawley, West Sussex (GB)

( * ) Notice: Subject to any disclaimer, the term of this patent is extended or adjusted under 35 U.S.C. 154(b) by 912 days.

(21) Appl. No.: 12/451,230

(22) PCT Filed: May 1, 2008

(86) PCT No.: PCT/GB2008/001543
§ 371 (c)(1),
(2), (4) Date: Oct. 30, 2009

(87) PCT Pub. No.: WO2008/132493
PCT Pub. Date: Nov. 6, 2008

(65) Prior Publication Data
US 2010/0136376 A1 Jun. 3, 2010

(30) Foreign Application Priority Data
May 1, 2007 (GB) .................................. 0708406.4

(51) Int. Cl.
*H01M 8/10* (2006.01)
*H01M 8/00* (2006.01)
*H01M 8/04* (2006.01)
*B41J 2/01* (2006.01)

(52) U.S. Cl.
USPC ................ 429/479; 429/400; 429/512; 347/1

(58) Field of Classification Search
USPC ................ 429/400, 479, 512; 347/1
See application file for complete search history.

(56) References Cited

U.S. PATENT DOCUMENTS

| 4,374,184 | A | 2/1983 | Somers et al. |
| 4,454,207 | A | 6/1984 | Fraioli |
| 2001/0010873 | A1 | 8/2001 | Thom |
| 2004/0038808 | A1 | 2/2004 | Hampden-Smith et al. |
| 2004/0191137 | A1* | 9/2004 | Chellappa ..................... 422/222 |
| 2005/0142433 | A1 | 6/2005 | Ueda et al. |
| 2005/0272595 | A1 | 12/2005 | Kobayashi et al. |

FOREIGN PATENT DOCUMENTS

| EP | 1 619 736 A1 | 1/2006 |
| EP | 1 662 598 A | 5/2006 |
| EP | 1 845 571 A2 | 10/2007 |
| GB | 2405028 | 2/2005 |
| GB | 2 441 983 A | 3/2008 |

(Continued)

*Primary Examiner* — Karie O'Neill Apicella
(74) *Attorney, Agent, or Firm* — Brinks Gilson & Lione

(57) ABSTRACT

A method of fuelling an intermediate-temperature solid oxide fuel cell comprises providing a fuel rich in carbon monoxide to an anode region, after the fuel has contacted a water gas shift reaction catalyst in the region of the anode, so that the water gas shift reaction occurs due to the presence of residual water in the fuel, and/or steam produced at the anode. A fuel cell assembly comprises a gas impermeable electrolyte between an anode and a cathode, first means for the supply of oxidant to the cathode, and second means for the supply of fuel to the anode that comprises a water gas shift reaction catalyst to catalyse the water gas shift reaction between carbon monoxide in the fuel and water/steam occurring as a residual in the fuel or from the reaction at the anode. A method also applies a catalyst to a metal substrate by ink-jet printing.

9 Claims, 2 Drawing Sheets

(56) References Cited

FOREIGN PATENT DOCUMENTS

| JP | 61 263066 A | 11/1986 |
| JP | 2004-179156 A | 6/2004 |
| JP | 2005 327554 A | 11/2005 |
| JP | 2007103014 A | 4/2007 |
| WO | WO 2003/063276 A2 | 7/2003 |
| WO | WO 2005/062408 A2 | 7/2005 |
| WO | WO 2006/046033 A | 5/2006 |
| WO | WO 2006046033 A1 * | 5/2006 ............. H01M 4/92 |

* cited by examiner

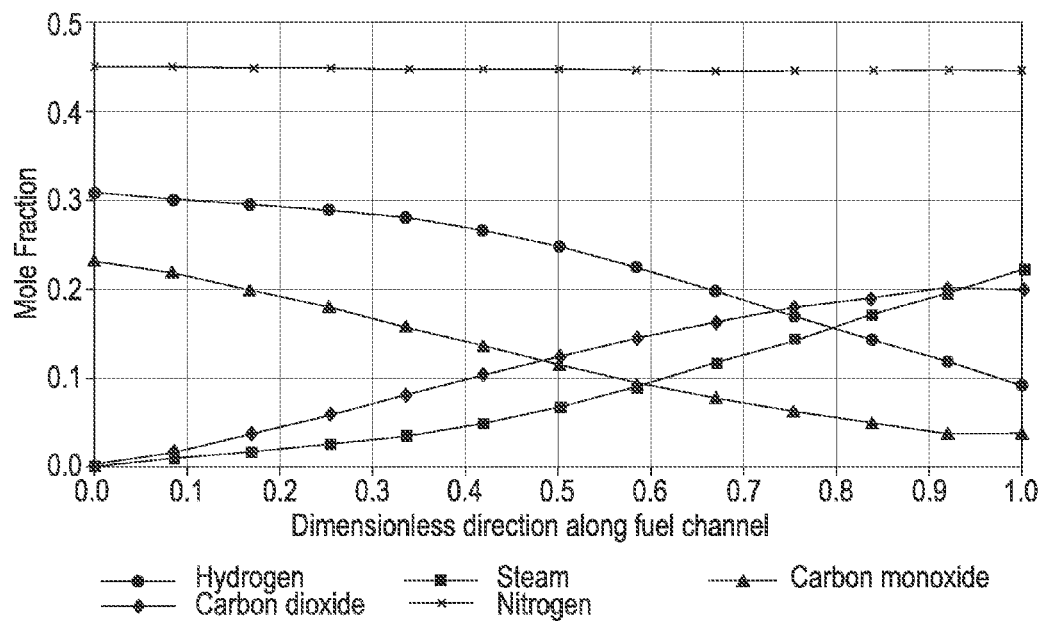
Fig. 2
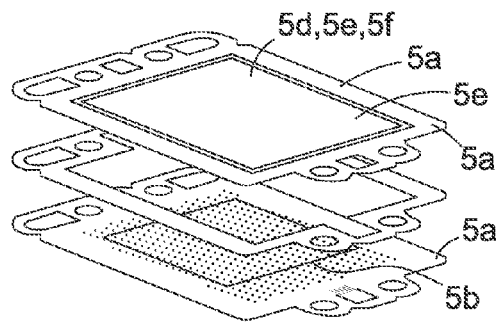
Fig. 3
| Fuel type | CPOX | ATR | CPOX and WGS |
|---|---|---|---|
| Butane | Y | Y | Y |
| Propane | Y | Y | Y |
| LPG | Y | Y | Y |
| Natural gas | Y | Y | Y |
| Town gas | Possible | Possible | Possible |
| Gasified coal | Possible | Possible | Possible |
| Jet A1 | N | Y | N |
| Methane | Y | Y | Y |
| Methanol | N | N | N |
| Diesel | N | Y | N |
| Autogas | Y | Y | Y |
| JP8 | N | Y | N |
Fig. 4

FUEL CELLS

RELATED APPLICATIONS AND CLAIMS TO PRIORITY

The present application is a filing under 35 U.S.C. §371 of International Patent Application PCT/GB2008/001543, filed May 1, 2008 and entitled "Improvements In or Relating to Fuel Cells," which claims priority to Great Britain patent application GB0708406.4, filed May 1, 2007, the entireties of which are hereby incorporated by reference.

BACKGROUND

It is well known to convert a hydrocarbon fuel such as propane to a synthesis gas containing hydrogen, carbon monoxide and nitrogen by oxidising the hydrocarbon with a substoichiometric amount of air—such as by the use of a catalytic partial oxidation (CPOX) reformer. In small-scale applications this is preferentially carried out over a precious-metal catalyst to ensure the formation of gaseous products is favoured over the formation of carbon. The resulting synthesis gas may be used as a fuel for a solid-oxide fuel cell.

The carbon monoxide of the synthesis gas can either, through a reaction with steam be converted to carbon dioxide with hydrogen in the water gas shift reaction (WGS), or can be directly electrochemically oxidised to carbon dioxide at the fuel cell anode.

All fuel cells will operate on hydrogen and some fuel cell technologies, such as solid oxide fuel cells (SOFCs) can also operate on carbon monoxide or a hydrogen carbon monoxide mix. However, most fuel cells operate more effectively on hydrogen than they do on carbon monoxide.

Prior-art solid oxide fuel cells and fuel cell stacks typically operate in the range 700-1000° C. Under these conditions internal consumption of carbon monoxide though both the water gas shift reaction catalysed by the fuel cell anode, and direct electrochemical oxidation, are feasible. In these technologies, the temperature of internal reforming within the fuel cell anode occurs at temperatures close to that of the fuel cell, say around 800° C. and often the fuel cell anode is a thick film of over 100 microns thick.

In US 2002/0031695 at [193] there is disclosed a reference to the use of methanol reforming catalysts in the flow field of the anode plenum, to achieve internal reforming (i.e. in the fuel cell) and which relates to liquid/paste electrolyte fuel cells operating at low temperature. Though it is not stated, this must rely on the supply of water/steam for the substantial reforming to take place internally, with all the associated disadvantages, such as the need for a water supply, pump, control system, and their associated costs.

Prior art also indicates a preference for either internal or external reforming for fuel cell based systems using non-pure hydrogen fuels. External reforming occurs when the fuel is reformed to synthesis gas external to the stack. Internal reforming occurs when the fuel is reformed within the stack, often at or very close to the fuel cell anode. There are advantages and disadvantages with each method, with a common argument for internal reforming is that it is easier, results in a system with less parts and higher efficiency. Those practiced in the art know that full internal reforming requires considerable energy to be used in the reforming process, and that there is a chemical and thermal energy trade off to be made along with a control system requirement to enable the use of internal reforming to be effective. Internal reforming brings fuel cell material selection, integration and system control challenges for start-up, dynamic operation and shut down.

Other prior art includes U.S. Pat. No. 5,340,664, GB2405028, U.S. Pat. Nos. 4,374,184, 4,454,207 and US 2001/0010873.

Using an external CPOX reformer is not without its limitations. Not only does the resulting reformate stream become more dilute with the presence of nitrogen coming from the air supplied to the reformer, but there is always a risk of downstream reformer carbon deposition when the temperature drops below 700° C., e.g. within an intermediate-temperature fuel cell stack.

Likewise, the use of a WGS reactor, as its name suggests, requires the supply of water to the reaction site so that the carbon monoxide and water can be shifted to carbon dioxide and hydrogen.

BRIEF SUMMARY

The present invention relates to intermediate-temperature solid oxide fuel cells (SOFCs) to which fuel rich in carbon monoxide is supplied either from a suitable direct source, for example consumer (town) gas, or indirectly from a hydrocarbon source reformed externally of the fuel cell.

The invention provides in one of its aspects a method of fuelling an intermediate-temperature solid oxide fuel cell comprising the steps of providing a fuel rich in carbon monoxide to the anode region of the fuel cell, after the fuel has contacted a water gas shift reaction catalyst in the region of the anode, so that the water gas shift reaction occurs due to the presence of residual water in the fuel, and/or steam produced at the anode.

It will be understood that the method operates without the need for an external supply of water or steam, because large amounts of water are not required since the fuel is either directly-supplied carbon monoxide rich fuel (e.g. town gas) or hydrocarbon fuel which has already been substantially reformed by CPOX reforming. Thus there is some WGS internally of the cell, but this is in contrast to high temperature SOFCs where it is known to carry out full reforming within the cell with the necessary external water/steam supply as stated above. The WGS reaction is closely matched thermally to the fuel cell reaction in the range 450-650° C., preferably 500-650° C. The WGS reaction does not substantially occur in the anode or the cell proper (anode/electrolyte/cathode).

Thus, the method preferably does not include the step of providing a discrete water supply (in the form of steam or otherwise) to the WGS catalyst. Preferably, the fuel provided to the anode region of the fuel cell is not rich in water. Preferably, the fuel provided to the anode region of the fuel cell contains insufficient water for full catalysis of the fuel into carbon dioxide and hydrogen by the WGS catalyst. Preferably, the fuel provided to the anode region of the fuel cell has a steam:carbon ratio of <1. More preferably, a steam:carbon ratio of <0.75. More preferably, a steam:carbon ratio of <0.5. More preferably, a steam:carbon ratio of <0.25. More preferably, a steam:carbon ratio of <0.20. More preferably, a steam:carbon ratio of <0.15. More preferably, a steam:carbon ratio of <0.10. More preferably, a steam:carbon ratio of <0.05.

In effect, therefore, the method permits extra energy to be extracted in the fuel cell by the WGS reaction using only the water/steam that is present, i.e. residual in the fuel or produced at the anode. In this way the intermediate temperature fuel cell can make effective use of the chemical energy of the carbon monoxide in the reformate, which would otherwise pass through the cell largely unreacted.

The invention provides in a second aspect a fuel cell assembly comprising an anode, a cathode separated from said anode, a gas impermeable electrolyte between said anode and said cathode, first means for the supply of oxidant to the cathode, second means for the supply of fuel to the anode, wherein said second means comprises a water gas shift reaction catalyst disposed close to the anode to catalyse the water gas shift reaction between carbon monoxide in said fuel and water/steam occurring as a residual in said fuel or from the reaction at the anode.

Preferably the fuel is supplied to the anode through a chamber having a wall with a porous region adjacent to which, externally of the chamber, the anode is disposed, said fuel passing through said porous region to contact the anode, said water gas shift reaction catalyst being disposed in said chamber close to but spaced from said porous region.

Additionally or alternatively said catalyst may be disposed on said wall in said chamber between pores of said porous region, such that said pores are open for the passage of said fuel.

Desirably, said catalyst is disposed on a support arranged in opposed relationship to but spaced a small distance from said porous region of said wall.

Said support is preferably provided by an internal surface of a second wall of said chamber, said second wall mounting said water gas shift reaction catalyst and being disposed parallel to but spaced a small distance from said porous region of said wall.

Said support may be provided by an insert mounted on an internal surface of a second wall of said chamber, said insert mounting said water gas shift reaction catalyst and being disposed parallel to but spaced a small distance from said porous region of said wall.

The invention provides in a third aspect, a method of disposing a water gas shift catalyst on a metal substrate for use in a fuel cell comprising applying the catalyst to the substrate by ink jet printing.

Preferably the method comprises the steps of:
(i) pre-oxidising the clean dry substrate by firing in air at up to 1,000° C. to provide an improved adherence layer on the metal;
(ii) depositing the catalyst pre-cursor by in a defined pattern using a mask or defined deposition path;
(iii) firing the pre-cursor layer at up to 700° C.;
(iv) depositing the catalyst using ink jet printing; and
(v) firing the catalyst at 300-600° C.

Alternatively, the method comprises the steps of:
(i) pre-oxidising the clean dry substrate by firing in air at up to 1,000° C. to provide an improved adherence layer on the metal;
(ii) depositing the catalyst pre-cursor with catalyst deposited on its surface, in a defined pattern using a mask or defined deposition path using ink jet printing; and
(iii) firing the pre-cursor layer at up to 700° C.

It will be seen that, according to the invention, combining a CO rich fuel stream with a WGS catalyst that is placed close to certain areas of the fuel cell anode side in an intermediate temperature solid oxide fuel cell operating at 450-650° C., allows for a high efficiency system to operate with quick response times, resulting in reduced fuel cell system complexity and a lower cost system Preferably the water gas shift reaction catalyst is a precious metal derived steam reforming catalyst, desirably a catalyst optimised for low methanation activity. However, a number of other catalyst formations could be used, including a precious metal high-temperature WGS catalyst formation.

Desirably the catalyst is disposed on a plate or grid forming part of the cell assembly, and it may be provided in the cell in a number of ways, including being wet deposited (wash-coated, screen printed, ink-jet sprayed, painted) over some or all of the (preferably stainless-steel) plate, wet deposited over the back of a stainless-steel fuel cell substrate, deposited into the pores of a porous metal substrate, coated on a stainless steel mesh or ceramic monolith or on ceramic pellets which is/are then inserted into the fuel channel of the anode.

A number of cells according to the invention may be disposed in a fuel cell stack.

BRIEF DESCRIPTION OF THE DRAWINGS

The present embodiments will become more fully understood from the detailed description given herein below and the accompanying drawings which are given by way of illustration only, and are not limitative of the present invention, and wherein:

FIG. 1b is a more detailed schematic view of a fuel cell stack of the kind used in the invention and as shown in FIG. 1a;

FIG. 2 is a graph showing the predicted concentration profile along a cross section of the anode compartment of a metal supported intermediate-temperature solid oxide fuel cells (IT-SOFC) when operating at full power;

FIG. 3 is an exploded schematic view of part of a metal supported solid oxide fuel cell stack incorporating fuel cells according to the invention; and FIG. 4 is a table of fuel types that can be reformed using CPOX, auto-thermal reforming (ATR), and CPOX with WGS.

DETAILED DESCRIPTION OF THE DRAWINGS AND PRESENTLY PREFERRED EMBODIMENTS

Figure 1A:
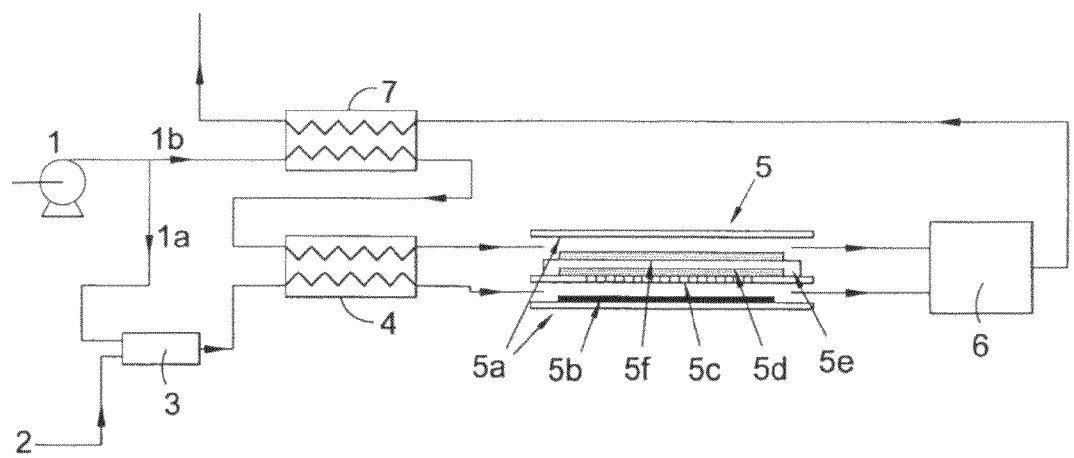
FIG. 1a is a schematic view of a SOFC fuel cell assembly and its fuel supply and exhaust arrangement according to the invention.

FIG. 1a shows a system configuration for an intermediate temperature solid oxide fuel cell system with a CPOX reformer. In this set-up the CPOX reformer is external to the stack, and operates at around 650-850° C., producing a CO rich fuel stream. The material selection and the design of the conduit conducting the reformate stream from the reformer to the fuel cell stack is carefully chosen so as to reduce or prevent carbon deposition on adjoining surfaces at these relatively low temperatures. The latter can be obviated to a large extent by the use of very short pipe runs and careful pipe material selection, for example the use of NiCr alloys such as 601, for the ducting of the reformate into the fuel cell stack.

The cell stack, operates at 450-650° C., so there is close thermal coupling between intermediate temperature fuel cell operation at 450-650° C. and the WGS reaction at 400-600° C., which is beneficial for stack thermal design and operational control considerations. It is this close coupling of temperatures of operation that make the ability to use WGS for desirable fuel cell operation in this temperature range, according to the invention, and makes it unsuitable for high temperature SOFC or low temperature fuel cell technologies.

Figure 1B:
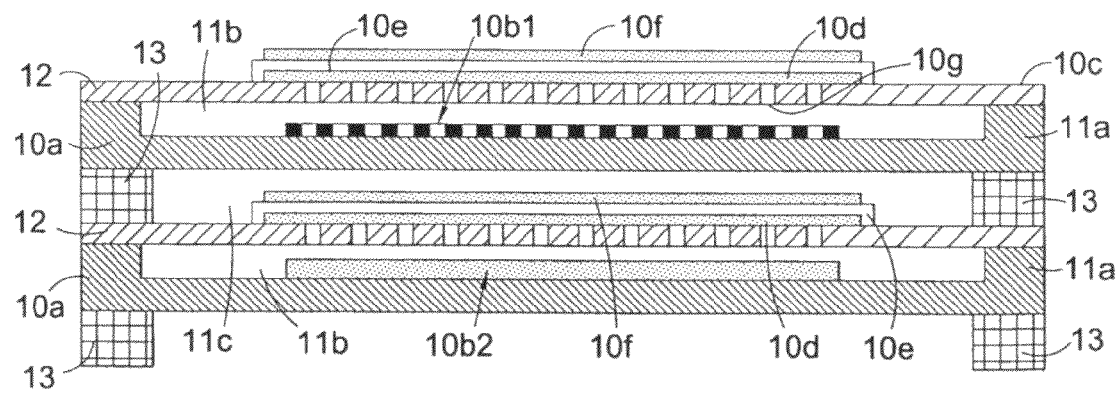

As shown in FIG. 1a, air is fed to the system using a blower (1), with the air stream being split into two streams, the main stream (1b) being fed to the fuel cell stack (5) at the cathode, after being first heated to around 450° C. by the air preheater (7) by heat exchange with the exhaust gas stream, then further heated by cooling the reformate from the reformer (3) before being fed to the stack at around 500° C. with an auxiliary stream (1a) being fed to the CPOX reformer (3). There is provided some means (not shown) of mass flow control on stream (1a) to maintain the desired oxygen/carbon ratio in the reformer. Hydrocarbon fuel (2) is also fed to the reformer, reacting with the air to produce a reformate gas consisting primarily of hydrogen, carbon monoxide and nitrogen. The reformate is then passed through a heat exchanger where it is cooled from 700-800° C. to around 500° C. by the stack air feed. The cooled reformate is then fed to the fuel cell stack (5) at the anode side. The stack in FIG. 1a shows only one cell for clarity, but in practice a sandwich of cells form the stack, two of which are shown in FIG. 1b. The repeat layer of the stack consists of stainless steel interconnect plates (5a), on or close to the anode side of one of which is deposited or located a catalyst layer (5b) which promotes the consumption of carbon monoxide by catalysing the WGS reaction. The fuel cell itself consists of a porous stainless steel substrate (5c) onto which is deposited an anode (5d). The anode is covered by a gas-impermeable electrolyte (5e), over which is deposited the cathode (5f). The hydrogen in the reformate is consumed in the fuel cell anode by electrochemical reaction with oxygen, producing steam. This steam, together with any residual water/steam in the fuel, then provides a reactant by which the carbon monoxide in the reformate can be converted to hydrogen by the catalysed WGS reaction. The depleted fuel stream, consisting mostly of carbon dioxide, steam and nitrogen with some residual hydrogen and possibly some residual CO, is fed to the tail gas burner (6). Here the remaining fuel is consumed by reaction with the cathode off-gas from the stack. The hot exhaust gas from the tail gas burner is then fed to the air preheater heat exchanger (7) where it is cooled by heat exchange with the incoming air stream (1b). The cathode air supply (1b) heated by the air preheater (7) and by cooling the reformate before being fed to the stack at around 500° C., provides the oxidant for the fuel cell reaction, but also provides the means by which a significant proportion of the heat generated by the cell reaction is dissipated. The hot cathode off-gas from the stack is then fed to the tail gas burner.

FIG. 1b shows one complete cell and part of another of a pair of fuel cells forming a stack. Each cell comprises an interconnect plate 10a having raised sides 11a to form a fuel channel 11b when overlaid by a steel substrate consisting of a stainless steel plate 10c perforated over a central region 10g thereof. The steel plate 10c is welded to the raised sides 11a in gas-tight manner at regions 12, and each steel plate is spaced from the interconnect plate of the next cell by a gasket 13. An anode 10d is deposited over the upper side of the perforated region of each steel plate 10c, such that the anode is contactable through perforations of the steel plates 10c by fuel supplied to the fuel channels 11b. Completely overlying the upper surface of the anode 10d is a gas-impermeable electrolyte 10e, and overlying that is deposited a cathode 10f. The space above the cathode between each steel plate 10c and the interconnect plate 10a above it and bounded by gaskets 13 provides an oxidant (air) channel 11c for the cathode.

The foregoing describes a known fuel cell stack arrangement, but the invention provides a WGS catalyst 10b1 and 10b2 disposed on the respective interconnect plate, spaced from respective steel plate 10c to leave a space for fuel to contact the anode 10d. In FIG. 1b, two catalyst arrangements are shown, 10b1 showing catalyst deposited on an insert mounted on a wall of the interconnect plate 11a, parallel to the porous perforated steel plate 10c, and 10b2 showing a catalyst layer deposited on the porous perforated steel plate 10c.

There will always be a small percentage of water vapour in the air supplied to the reformer (unless it is supplied from a dry air supply), and generally the reformation of hydrocarbon fuels also produces some water vapour. Thus the reformate stream already contains some water when it comes into contact with the WGS catalyst. In addition, the hydrogen concentration in the reformate stream will react at the anode of the fuel cell, producing water vapour, which in turn also feeds the WGS reaction. With this set-up it is therefore possible to remove the need for either some form of external system water supply or a fuel cell exhaust condensing water recovery and reformer water/steam feed system, or anode off-gas recycle.

In addition, to save on the cost of the WGS catalyst, there is only a requirement to have sufficient concentration of catalyst material or coverage of WGS catalyst to ensure conversion of the CO to $CO_2$. Thus the coating process of the WGS catalyst insert, or WGS catalyst deposition process can be designed to accommodate this design feature based on the type of fuel and type of operating environment. For instance, the WGS catalyst could be deposited onto the catalyst pre-cursor using ink-jet spraying where the density of the deposited ink jet droplets is varied along the line of expected reactant gas flow. The deposited droplet density pattern can be designed to take into account the concentration of CO left to convert, the hydrogen available to the remaining anode volume of the fuel cell, the temperature of the WGS catalyst environment and the amount of water available for the WGS reaction. Thus the deposited catalyst area could de disposed in a region after the reactant gas passes into the area containing the anode and be deposited in one or more areas until the majority of the CO has been shifted to $H_2$ and $CO_2$ such that any further conversion would not affect the system operating efficiency given the additional cost of the extra catalyst material involved.

Examples of preparing water gas shift catalyst coating on a metal interconnect are as follows:

A)
1. Form a sheet of metal (50 to 1000 microns thick) such as an interconnect plate from metals such as Crofer 22 APU or EU designation 1.4509
2. Clean and dry the formed sheet or plate
3. Pre-oxidise the sheet or plate by firing in air at up to 1,000° C. to provide an improved adherence layer on the steel
4. Deposit the catalyst pre-cursor by classical techniques such as wash coating or spraying. The pre-cursor can be e.g. alumina or ceria. The deposition is in a defined pattern using a mask or defined deposition path
5. Fire the pre-cursor layer at, say, up to 700° C.
6. Deposit the catalyst, such as in an aqueous salt solution, in a controlled way using classical techniques such as wash coating or spraying or ink-jet printing
7. Fire the catalyst at 300-600° C.

B) An alternative method involves depositing the pre-cursor as a pre-coated pre-curser—i.e. already having the metal catalyst deposited on the surface of the pre-curser. In this case steps 6 and 7 above are not required.

A preferred method involves coating an insert that would sit between the interconnect and the substrate. This method has several advantages over coating the interconnect in that it reduces the number of heat treatments seen by the fuel cell stack layers, and, as it can be prepared off-line, also allows for rapid placement and throughput of parts for the fuel cell stack build. Such coated inserts include coated meshes, coated weaves, formed plates or porous ceramic sheet. These inserts also offer increased surface area for catalyst coverage and, if the insert is dip coated, less wastage of catalyst during the preparation process. For example, if the insert is a coarse woven mesh of say 5-30 micron wire diameter with the weave density being dictated by anticipated catalyst activity during fuel cell operation. A further advantage of this process is that during operation of the fuel cell, the thermal expansion of the coated mesh is separated from that of the fuel cell and thus improves durability. Catalyst coating of meshes and weaves is well known to those skilled in the art and there are many companies who offer expertise and products in this field.

In the case of a coated insert, the fuel cell stack layer is built by placing the coated insert onto location points on the interconnect plate, placing the metal supported fuel cell onto the interconnect plate and welding using, say, a laser welder, the fuel cell non-porous region to the edges of the interconnect plate. This then forms the basis of a fuel cell stack layer. In order to build the stack, a non-conductive spacer gasket is placed onto the top of the fuel cell, such as Flexitallic's Thermiculite 866 gasket material. The cathode current collector is then placed onto the top surface of at least one portion of the gasket. This structure is then a repeat layer of a metal supported fuel cell stack, and the layer can be placed on top of one another layer to achieve the required power output from the stack or the stack module.

In order to reduce the possibility for carbon deposition in the fuel cell area as a result of the CO shift (boudouard) reaction in the fuel cell, it is preferable to separate the start of the WGS reaction until steam is available with the reformate stream. Thus the start of the WGS catalyst can be separated sufficiently from the point at which the reformate stream first encounters the fuel cell anode—say the start of the WGS catalyst and the anode can be separated by 0.2-2 cm in a fuel cell measuring 12 cm long. The required separation can be calculated from the speed of flow of the reformate in and adjacent to the anode area and also the reaction time taken for the steam to leave the anode area and contact the area where the WGS is located. Carbon deposition can also be suppressed by using a ceria carrier for the WGS catalyst and also by using a precious metal catalyst as the WGS catalyst.

The effect of internal WGS is illustrated in FIG. 2, which shows the predicted concentration profile along a cross section of the anode compartment of a metal supported IT-SOFC when operating at full power. Note that the mole fraction of carbon monoxide falls across the anode compartment to be replaced by an equivalent fraction of carbon dioxide, showing the effect of the WGS reaction. However, it is also worth noting that the mole fraction of hydrogen never exceeds around 30%, which will inevitably lead to a lower fuel cell power density when compared to a steam-reformed feed, which could contain a molar fraction of hydrogen of up to 60%.

FIG. 3 shows an exploded view of part of a metal supported solid oxide fuel cell stack indicating the areas where the WGS catalyst is deposited on the metal interconnect plate or the areas where the WGS coated mesh or inserts would be placed.

FIG. 4 shows a table of fuel types that can be reformed using CPOX, auto-thermal reforming (ATR) and CPOX and WGS For systems where low cost and simplicity is more important than efficiency, CPOX reforming offers a number of advantages, particularly when coupled with a solid-oxide fuel cell stack which can operate on a carbon-monoxide rich fuel stream. Intermediate temperature SOFC stacks have advantages over prior-art, higher temperature SOFC stacks, which have been described elsewhere. However, one disadvantage is that their lower operating temperature reduces their ability to operate effectively on carbon monoxide as a fuel gas, although unlike lower-temperature fuel cell types they are tolerant of high concentrations of CO.

The present invention allows the effective use of intermediate temperature SOFC stacks with CO rich fuel streams, and thus CPOX reformers, thus combining the benefits of both technologies For mid- to small-scale power generation applications (<50 kWe) a CPOX reformer is a fast start-up reformer option offering a simple, low cost fuel reforming option. The downside is that, because the CPOX reaction uses air to reform, the resulting fuel stream is more dilute than other forms of reformate. Thus by using WGS to shift the CO to CO2 and hydrogen this dilution effect can be partially offset. The WGS reaction occurs at around 450-600° C. and advantageously is close to that of the operating temperature of the intermediate temperature fuel cell, and because the WGS reaction is mildly exothermic, in the IT-SOFC fuel cell stack situation it will be subject to, and its operation will result in, very small temperature variations along the active reformate fuel stream conversion path. In addition, the WGS catalyst can steam reform any hydrocarbon slip that might occur from the main reformer, thus prolonging the durability of the fuel cell system.

The invention's use of a dedicated catalyst within the fuel channel of an intermediate temperature fuel cell stack is also applicable to internal steam reforming of hydrocarbons and improving the CO utilisation of a steam reformed and/or autothermally reformed reformate stream.

The use of a CPOX reformer in the fuel cell system can mean a slightly higher thermal efficiency than a steam reformer based set-up, and this can be advantageous where there is a premium for the heat output—such as in a CHP application.

This set-up is applicable to many hydrocarbon fuel types; for example: Butane, propane, LPG, natural gas, town gas, gasified coal, methane, autogas The invention can clearly be used with a directly supplied CO rich fuel, in which case CPOX reforming is avoided.

Note that the invention is not suitable for use in fuel cells running on fuels which do not have at least a small water or hydrogen component, as there is a requirement for at least some water vapour to be in the fuel stream for the WGS reaction to occur. This water addition could occur by steam injection or bleeding in some hydrogen into the fuel stream which could even come from recycling the exhaust from another SOFC stack.

Start-up procedure:
Ignite CPOX
Heat up the fuel cell stack using the burner assembly and the hot reformate stream
The anode reaction in the fuel cell stack will kick in around 400-500° C.
At this point the stack will be operational and the burner fuel can be cut back or isolated.
Shut-down:
Redox stable fuel cell
  Shut off the fuel supply to the reformer and hence to the fuel cell stack
  Flow air through the cathode side of the fuel cell stack if required
Non-redox stable fuel cell
  Bleed fuel down to the reformer and hence to the fuel cell stack
  Continue to blow air over the cathode side
  The temperature of the stack will drop. At a fuel cell stack temperature of around 300° C. (below the redox point for the catalyst in the anode) the fuel supply can be cut and the stack allowed to cool naturally
  Flow air through the cathode side if required Applications for this type of fuel cell reformer set-up include applications where overall system efficiency is not the key criterion, but, say, the ability to operate without the need for water is. Such applications could include remote surveillance or communications systems or applications in cold climates where there is a risk of stored water freezing. Other applications include transport power, for instance, for automotive or marine applications where there is a need to provide electrical power independent of the main drive engine—a so-called auxiliary power unit (APU)

A preferred arrangement involves coating an insert which would sit between the interconnect and the substrate. This has several advantages over coating the interconnect in that it reduces the number of heat treatments seen by the fuel cell stack layers, and, as it can be prepared off-line, also allows for rapid placement and throughput of parts for the fuel cell stack build. Such coated inserts include coated meshes, coated weaves, formed plates or porous ceramic sheet. These inserts also offer increased surface area for catalyst coverage and, if the insert is dip coated, less wastage of catalyst during the preparation process. For example, if the insert is a coarse woven mesh of say 5-30 micron wire diameter with the weave density being dictated by anticipated catalyst activity during fuel cell operation. A further advantage is that during operation of the fuel cell, the thermal expansion of the coated mesh is separated from that of the fuel cell and thus improves durability.

It will be readily appreciated by those skilled in the art that simple modifications may be made to the methods and assemblies of the invention without departing from the scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

The invention claimed is:

1. An intermediate-temperature solid oxide fuel cell assembly comprising:
   an anode;
   a cathode separated from the anode;
   a gas impermeable electrolyte between the anode and the cathode;
   first means for the supply of oxidant to the cathode; and
   second means for the supply of fuel to the anode, the second means comprises a water gas shift reaction catalyst disposed close to the anode to in-use catalyse the water gas shift reaction between carbon monoxide in the fuel and water/steam occurring as a residual in the fuel or from the reaction at the anode,
   wherein the fuel has a steam:carbon ratio of <1 and hence contains insufficient water for full catalysis of the fuel into carbon dioxide and hydrogen by the water gas shift reaction catalyst.

2. The fuel cell assembly of claim 1, wherein the fuel is supplied to the anode through a chamber having a wall with a porous region adjacent to which, externally of the chamber, the anode is disposed, the fuel passing through the porous region to contact the anode, in which the water gas shift reaction catalyst is disposed on the wall in the chamber between pores of the porous region, such that the pores are open for the passage of the fuel.

3. The fuel cell assembly of claim 1, wherein the fuel is supplied to the anode through a chamber having a wall with a porous region adjacent to which, externally of the chamber, the anode is disposed, the fuel passing through the porous region to contact the anode, the water gas shift reaction catalyst being disposed in the chamber close to, but spaced from, the porous region.

4. The fuel cell assembly of claim 3, wherein the water gas shift reaction catalyst is disposed on a support arranged in opposed relationship to, but spaced a small distance from, the porous region of the wall.

5. The fuel cell assembly of claim 3, wherein the fuel is supplied to the anode through a chamber having a wall with a porous region adjacent to which, externally of the chamber, the anode is disposed, the fuel passing through the porous region to contact the anode, in which the water gas shift reaction catalyst is disposed on the wall in the chamber between pores of the porous region, such that the pores are open for the passage of the fuel.

6. The fuel cell assembly of claim 4, wherein the support is provided by an internal surface of a second wall of the chamber, the second wall mounting the water gas shift reaction catalyst and being disposed parallel to, but spaced a small distance from, the porous region of the wall.

7. The fuel cell assembly of claim 4, wherein the support is provided by an insert mounted on an internal surface of a second wall of the chamber, the insert mounting the water gas shift reaction catalyst and being disposed parallel to, but spaced a small distance from, the porous region of the wall.

8. A method of fuelling an intermediate-temperature solid oxide fuel cell comprising providing a fuel rich in carbon monoxide to the anode region of the fuel cell, after the fuel has contacted a water gas shift reaction catalyst in the region of the anode, so that the water gas shift reaction occurs due to the presence of residual water in the fuel, and/or steam produced at the anode,
   wherein the fuel has a steam:carbon ratio of <1 and hence contains insufficient water for full catalysis of the fuel into carbon dioxide and hydrogen by the water gas shift reaction catalyst.

9. The method of claim 8, the method further comprising: prior to providing a fuel rich in carbon monoxide to the anode region of the fuel cell: disposing the water gas shift reaction catalyst on a substrate by ink jet printing; and positioning the substrate within the fuel cell.

* * * * *